United States Patent [19]

Menezes et al.

[11] Patent Number: 5,629,646

[45] Date of Patent: May 13, 1997

[54] APPARATUS AND METHOD FOR POWER REDUCTION IN DRAM UNITS

[75] Inventors: Vinod J. Menezes, Bangalore, India; Subramani Kengeri, Norwood, Mass.; Raghava Madhu, Kerala, India

[73] Assignee: Texas Instruments Incorporated, Dallas, Tex.

[21] Appl. No.: 407,568

[22] Filed: Mar. 21, 1995

[51] Int. Cl.$^6$ .................................................. G05F 1/10
[52] U.S. Cl. .......................... 327/536; 327/535; 327/538
[58] Field of Search ................................. 327/536, 537, 327/538, 540, 316, 323, 332, 205, 535

[56] References Cited

U.S. PATENT DOCUMENTS

| | | | |
|---|---|---|---|
| 4,017,747 | 4/1977 | Sheng | 327/205 |
| 4,929,917 | 5/1990 | Yokogawa et al. | 331/1 A |
| 5,036,527 | 7/1991 | Halim et al. | 375/98 |
| 5,202,587 | 4/1993 | McLaury | 327/536 |
| 5,363,333 | 11/1994 | Tsujumoto | 327/538 |
| 5,483,486 | 1/1996 | Javanifard et al. | 327/536 |
| 5,491,445 | 2/1996 | Moller et al. | 327/540 |

*Primary Examiner*—Timothy P. Callahan
*Assistant Examiner*—Jung Ho Kim
*Attorney, Agent, or Firm*—Robby T. Holland; William W. Holloway; Richard L. Donaldson

[57] ABSTRACT

In a DRAM unit in which the substrate bias voltage is maintained within predetermined limits by a of voltage detectors and a charge pump, a third voltage detector is provided which detects a intermediate substrate bias voltage level that is within the voltage range identified by the pair of voltage detectors. When the third voltage level detects that the intermediate substrate bias voltage has been traversed, the charge pump is activated at a reduced level to drive the substrate bias voltage to recross the intermediate substrate bias voltage level. This technique permits the DRAM unit to operate in a stand-by mode at a lower power level, especially in a standby mode of operation, than when the substrate bias voltage is maintained only by the two voltage limit detectors and a single power level charge pump.

2 Claims, 1 Drawing Sheet

APPARATUS AND METHOD FOR POWER REDUCTION IN DRAM UNITS

BACKGROUND OF THE INVENTION

1. Field of the Invention

This invention relates generally to dynamic random access memory (DRAM) units and, more particularly, to the apparatus incorporated in the DRAM units which maintain the voltage levels in the DRAM unit within predetermined tolerances. The maintenance of specified voltage levels, especially the substrate bias voltage level, is especially critical in the DRAM units in order not to compromise the operation.

2. Description of the Related Art

The DRAM unit has found wide use in data processing system memory applications requiring low power, low cost, and high densities of storage cells. System designs using battery powered DRAM units for normal operation and/or for data storage backup, i.e., in notebook computers, space applications, main memory in data processing units equipped with data recovery from power supply failures, etc., are becoming increasingly important. System designs which can provide lower standby power are similarly of increasing interest.

The maintenance of a predetermined substrate bias voltage level within a DRAM unit is typically provided by a charge pump which maintains voltage (and charge) levels within a predetermined operating range during operation of the DRAM unit. Typically, a level detector is provided to detect the passage of the voltage from a level within the operating range of the system to a voltage level outside of the operating range. When the voltage level passes outside of the predetermined operating range, the charge pump is activated to alter the charge on the semiconductor substrate, (i.e., to alter the voltage across the plates of the storage cell capacitor).

Analog techniques, where the operation of the charge pump is controlled by the bias value, have been reported. But these techniques have inherent problems such as leading the chip to a danger level of substrate bias before the charge pump can respond and restore the level.

A need has therefore been felt for apparatus and an associated method for providing apparatus for controlling the substrate bias voltage operating at low power during standby, for providing easy incorporation in DRAM units which are already being fabricated.

SUMMARY OF THE INVENTION

The aforementioned and other features are provided, according to the present invention, by a circuit in which a charge pump is activated when the substrate bias voltage level of a DRAM unit is outside of an operating voltage range determined by a pair of voltage detectors. The present invention incorporates a third voltage detector which identifies when the substrate bias voltage is above or below a voltage level having an intermediate value in the operating voltage range. The reduction in the substrate bias voltage which activates the third voltage detector results in operation of the charge pump at a reduced level to pump the change in the substrate bias voltage level. The reduced charge pump operation will continue until the substrate bias voltage level retraverses the level identified by the third voltage detector or traverses a voltage level identified by one of the other voltage detectors. During the standby mode of operation of the DRAM memory unit, the reduced operation of the charge pump operation can compensate for the leakage of charge from the substrate and can result in lower power consumption during standby operation of the DRAM unit.

These and other features of the present invention will be understood upon reading of the following description along with the Figure.

DESCRIPTION OF THE PREFERRED EMBODIMENTS

1. Detailed Description of the Drawings

Figure 1:
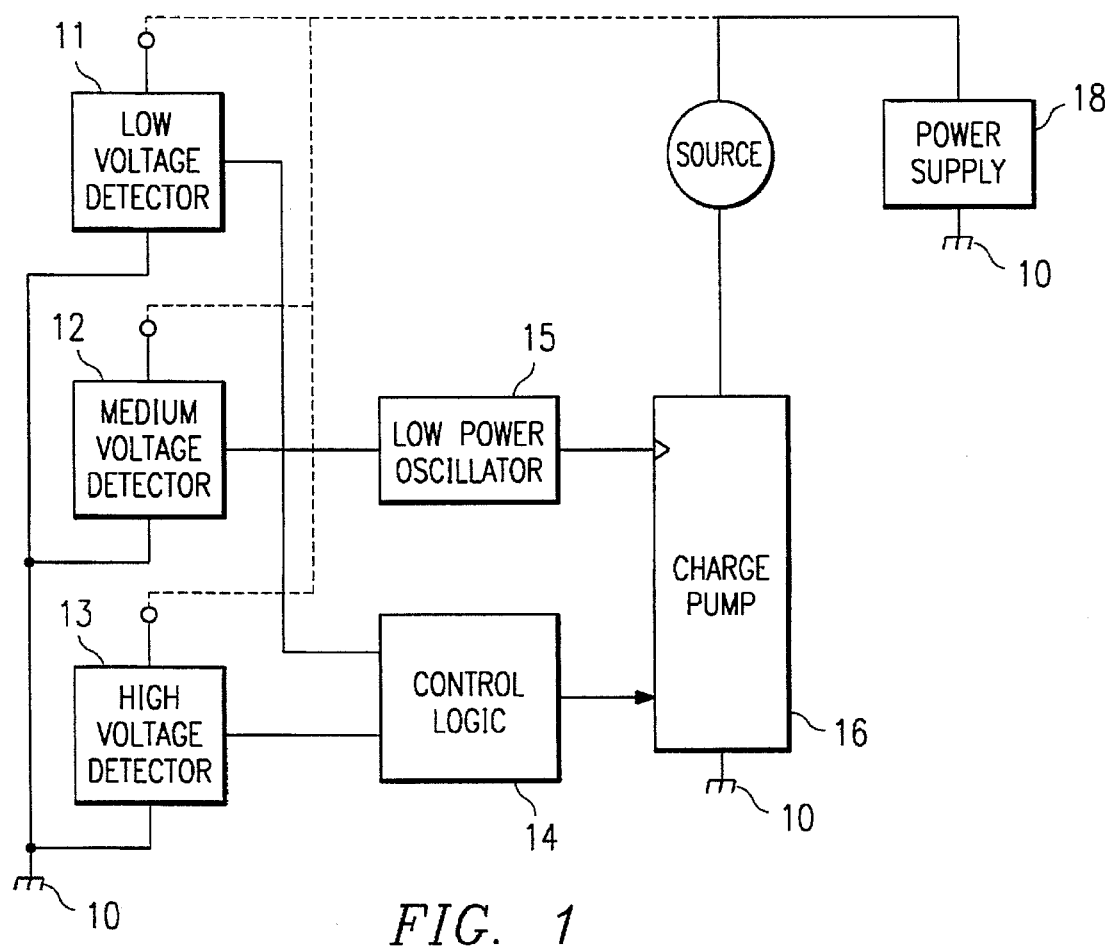
FIG. 1 is a block diagram of the power reduction apparatus for use in Dram units according to the present invention.

Referring to FIG. 1, a block diagram of the preferred embodiment of the present invention is shown. The charge pump 16 can increase or decrease the substrate bias voltage by changing the amount of charge stored on the substrate 10. The power supply 18 provides the charge which is controlled by the charge pump 16. The charge pump 16 is activated in response to control signals from control logic 14. When the substrate bias voltage falls outside the voltage range determined by the low voltage detector 11 and the deep voltage detector 13, a signal is applied from one of voltage detectors 11 and 13 to control logic 14 which determines whether the charge pump 16 increases the charge on the substrate or cuts off. The change in the charge returns the substrate bias voltage to the range determined by voltage detectors 11 and 13. Midpoint or intermediate voltage detector 12 detects when the substrate bias voltage passes from a second voltage range determined by the deep voltage detector 13 and midpoint voltage detector 12 into a third voltage range determined by the low voltage detector 11 and the midpoint voltage detector 12. When the substrate bias voltage passes from the second voltage range into the third voltage range, the midpoint voltage detector applies a signal to the low power oscillator 15. Low power oscillator 15 actives the charge pump 16 at a reduced power level in order to return the substrate bias voltage from third voltage range to the second voltage range.

2. Operation of the Preferred Embodiment(s)

A normal (4MB) DRAM consumes about 200 uA of current during standby operation. Most of this current is consumed by circuits monitoring and controlling the substrate bias. During standby operation, all previously known techniques for maintaining the substrate bias voltage level use voltage level detectors to monitor the substrate bias voltage. The output signals of the voltage level detectors are used to control the substrate bias voltage by controlling the operation of charge pump. As indicated above, the substrate bias voltage is usually maintained within a predetermined operating range and voltage detectors are provided control the operation of the charge pump and return the substrate bias voltage to the predetermined operating range when the substrate bias voltage level is outside the operating range. The voltage limits are selected so that the operation of the DRAM unit is not compromised as long as the DRAM unit is operating within the range. Typically for a p-substrate DRAM units, the operating range would be −0.8 V to −3.0 V.

Studies on silicon units have shown that substrate bias does not degrade substantially during standby operating, the change voltage being approximately −4 uV/uS. The operating range is too large to reduce overall current consumption. Current saving is achieved only when the bias value reaches the cutoff point, which in the example cited above is −3.0 V.

The technique incorporates a midpoint or intermediate (trip point) voltage level detector in addition to the two limit voltage level detectors. The intermediate voltage level detector is set to activate the charge pump at an intermediate level. In the range between the limit voltage level and the intermediate voltage level, an analog/digital control circuit controls the operation of the pump or other power-related circuits to reduce the consumption to a very low value when the operating voltage is within the safe range. Thus, an apparatus for controlling the substrate bias voltage in a DRAM unit is provided. The apparatus includes a charge pump coupled to a substrate and responsive to control signals. The charge pump operates at a first power level to raise an absolute value of the substrate bias voltage in response to a first control signal. The charge pump turns off in response to a second control signal. The charge pump operates at a second power level to raise an absolute value of the substrate bias voltage in response to a third control signal. The apparatus also includes a first voltage detector for providing the first control signal when an absolute value of the substrate bias voltage is below a preselected first magnitude. A second voltage detector provides the second control signal when an absolute value of said substrate supply voltage is above a preselected second magnitude. A third voltage detector provides the third control signal when an absolute value of the substrate bias voltage is below a preselected third magnitude, the preselected third magnitude being between the first magnitude and the second magnitude.

Viewed in another manner, the intermediate or midpoint voltage detector provides the operating range of the charge pump with a safe operating range and a reduced power operating range. When the substrate bias voltage is in the safe operating range, no charging of the substrate is required. In the reduced power operating range, the charging of the substrate can be performed at a reduced power level because the substrate bias voltage level is still within the predetermined operating range for the DRAM unit.

It will be clear that the present invention is applicable to DRAM units implemented in p- or n- semiconductor materials. The charging of the substrate, in either implementation, will result in the absolute value of the substrate bias voltage increasing, i.e., the bias voltage will become more negative in the n-implementation and will become more positive in the p-implementation.

The advantages of this technique are the following. The substrate bias voltage degradation is identified at an early level and the voltage level can be restored without the substrate bias voltage approaching a danger level. Current and power are conserved because the recovery is performed by the reduced power operation of the charge pump. As long as the bias is within the safety limit, all substrate bias control circuits are not operating and a total power reduction is achieved.

While the invention has been described with particular reference to the preferred embodiment, it will be understood by those skilled in the art that various changes may be made and equivalents substituted for elements of the preferred embodiment without departing from the invention. For example, the present invention has been described with particular reference to DRAM units. However, the technique for reducing the power in a standby mode of operation, while maintaining a voltage level with in a range of voltage levels, in the presence of voltage decay (i.e., resulting from stored charge decay in the present invention) can be applicable to a range of applications. In addition, many modifications may be made to adapt a particular situation and material to a teaching of the invention without departing from the essential teachings of the present invention.

As is evident from the foregoing discussion, certain aspects of the invention are not limited to the particular details of the examples illustrated, and it is therefore contemplated that other modification and application will occur to those skilled in the art. It is accordingly intended that the claims shall cover all such modifications and applications as do not depart from the spirit and scope of the invention.

What is claimed is:

1. Apparatus for controlling the substrate bias voltage in a DRAM unit, said apparatus comprising:

a charge pump coupled to a substrate and responsive to control signals, said charge pump operating at a first power level to raise an absolute value of said substrate bias voltage in response to a first control signal, said charge pump turning off in response to a second control signal, said charge pump operating at a second power level to raise an absolute value of said substrate bias voltage in response to a third control signal; and a first voltage detector for providing said first control signal when an absolute value of said substrate bias voltage is below a preselected first magnitude;

a second voltage detector for providing said second control signal when an absolute value of said substrate supply voltage is above a preselected second magnitude; and a third voltage detector for providing said third control signal when an absolute value of said substrate bias voltage is below a preselected third magnitude, said preselected third magnitude being between said first magnitude and said second magnitude.

2. The apparatus of claim 1 wherein said charge pump includes a low power oscillator responsive to said third control signal.

* * * * *